Nov. 21, 1950  N. C. HOTOP  2,530,578
BODY FOR PLUMBERS' TRUCKS
Filed May 11, 1948  4 Sheets-Sheet 1
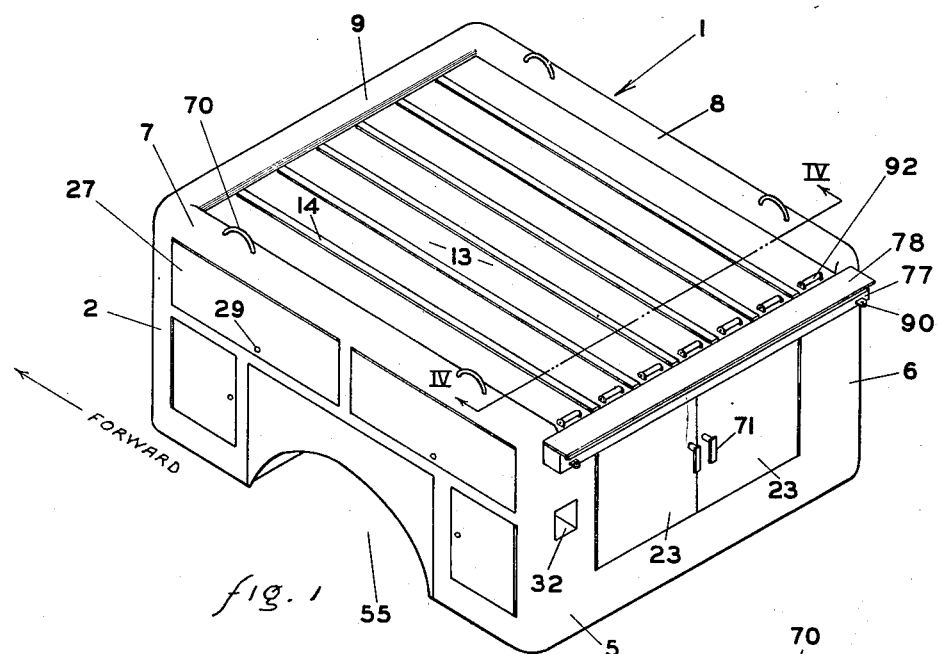
fig. 1
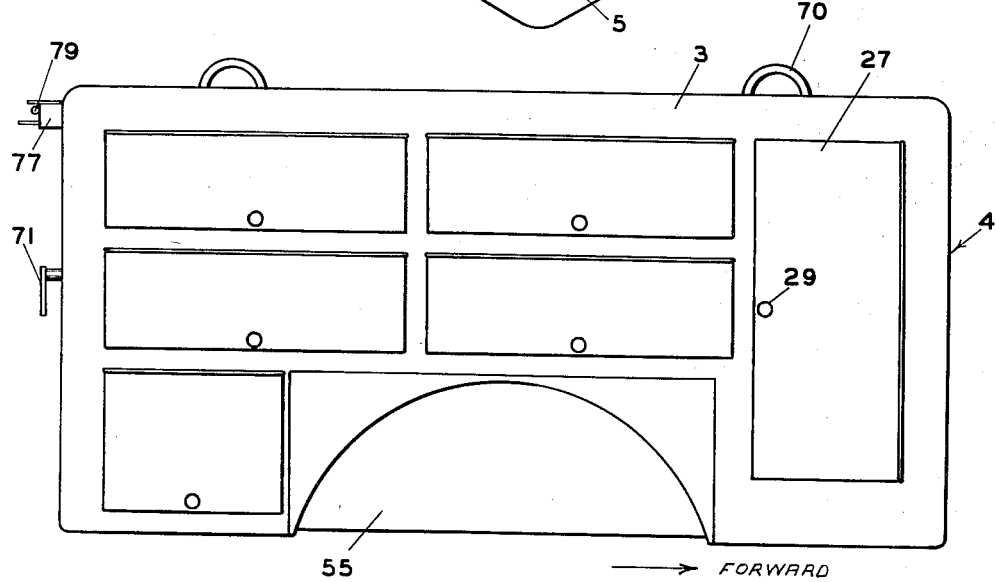
fig. 2
Inventor
NORBERT C. HOTOP
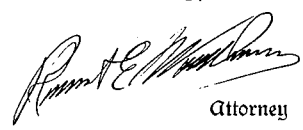
Attorney Nov. 21, 1950            N. C. HOTOP            2,530,578
BODY FOR PLUMBERS' TRUCKS
Filed May 11, 1948            4 Sheets-Sheet 2
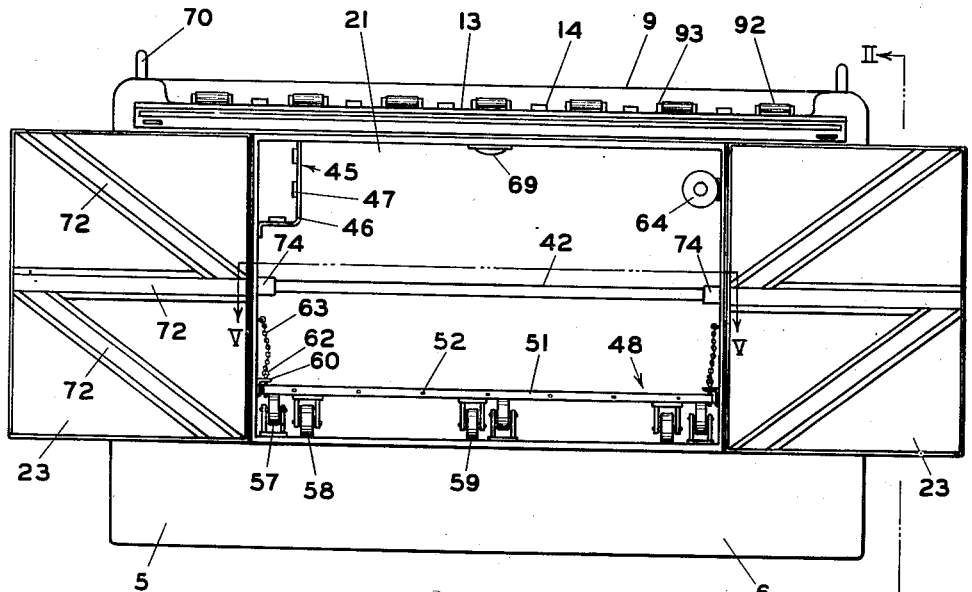
fig. 3
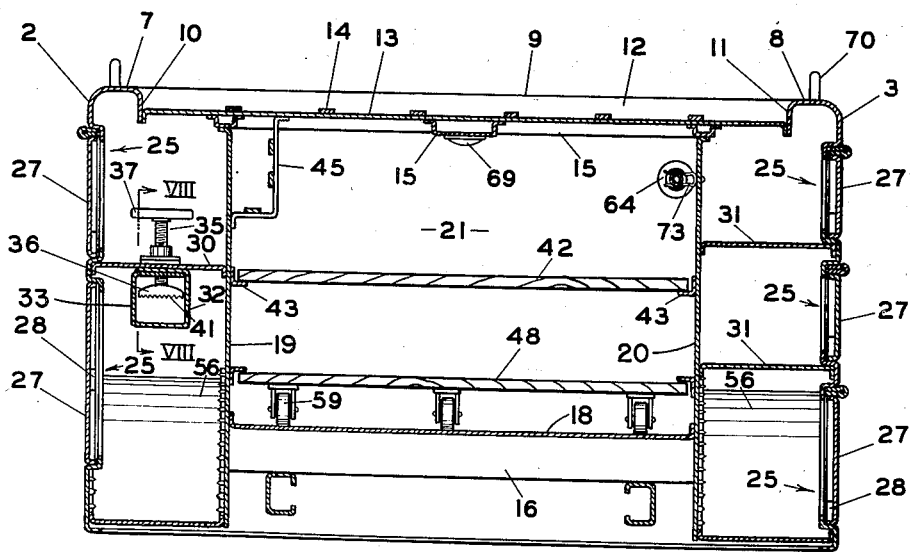
fig. 4
Inventor
NORBERT C. HOTOP
Attorney

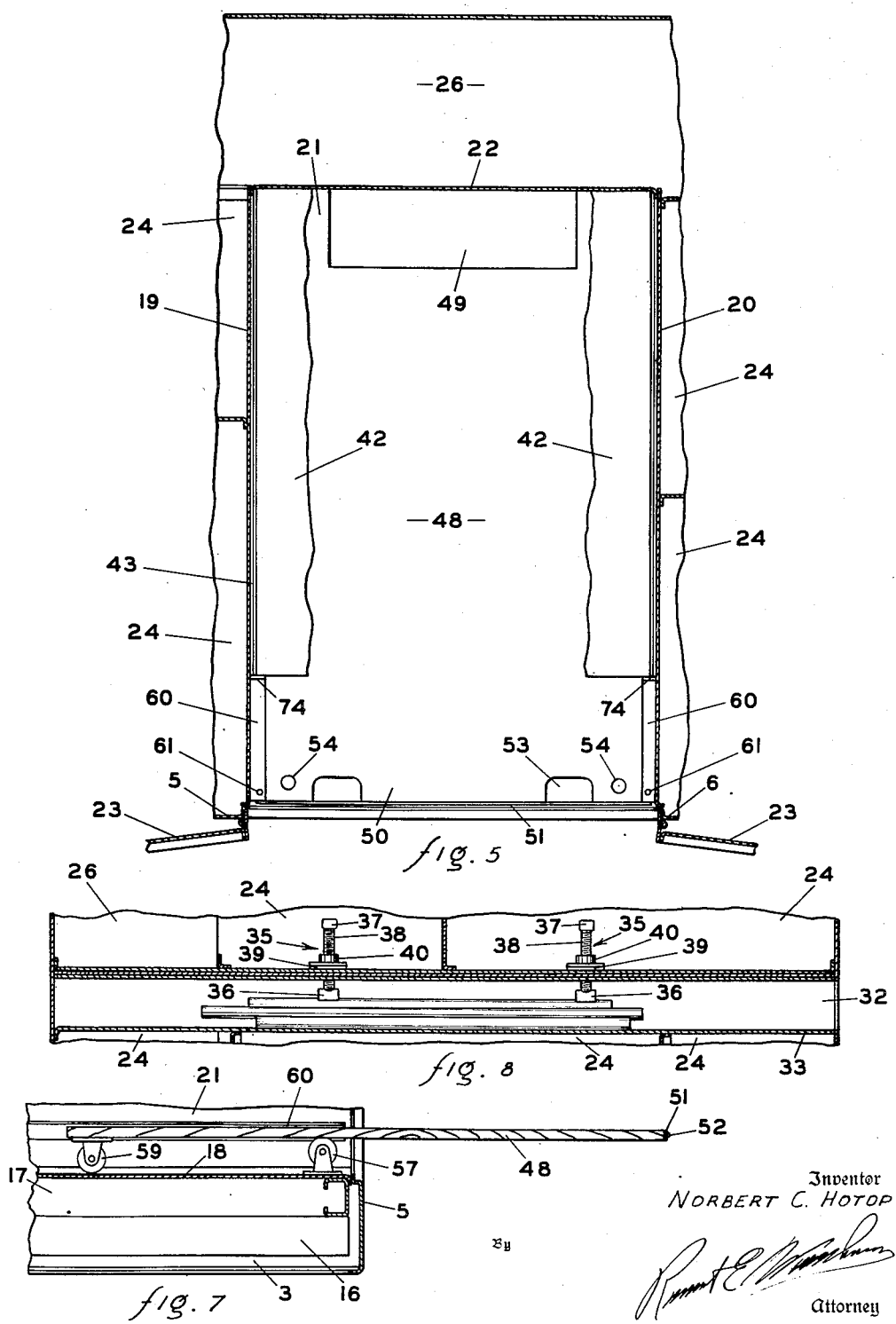

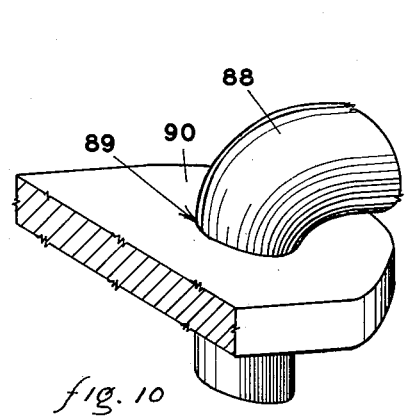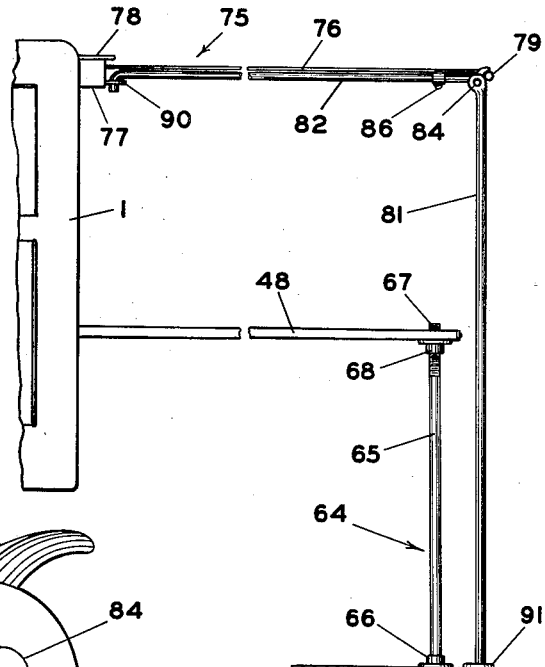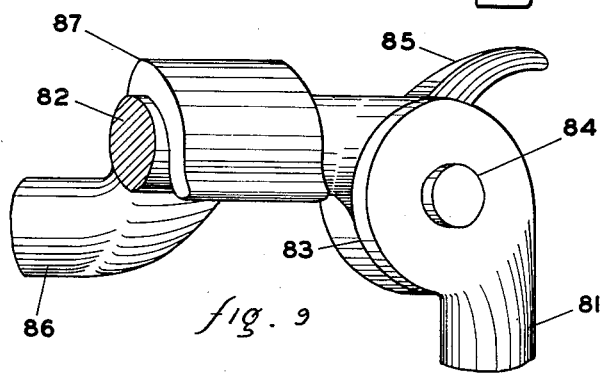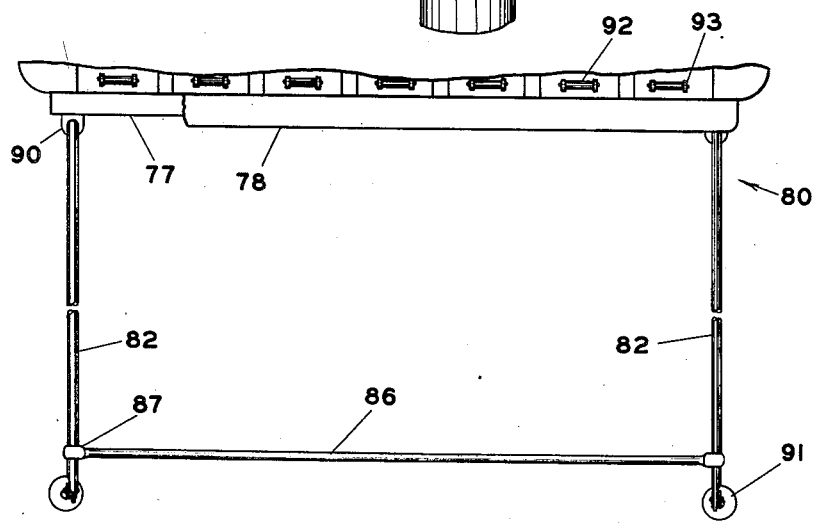

Patented Nov. 21, 1950

2,530,578

UNITED STATES PATENT OFFICE 2,530,578

BODY FOR PLUMBERS' TRUCKS

Norbert C. Hotop, Kalamazoo, Mich.

Application May 11, 1948, Serial No. 26,342

2 Claims. (Cl. 296—24)

This invention relates to the construction and arrangement of a truck body, and more particularly to a truck body designed for plumbers and other users of trucks wherein tools and materials must necessarily be transported by the driver to the place where they are to be used and a workbench must be provided at the place of use.

Although heretofore many truck bodies have been designed to be both efficient and convenient to use for such purposes, each of these designs has in practice failed to fulfill the requirements of such a device. In designing such a truck body it is desirable to provide some means by which a workbench or a working platform may be quickly and easily erected at the work locus in order to facilitate the job. Such a workbench must be substantially unobstructed and at the same time large enough to provide an adequate working area. Existing truck bodies designed for this purpose have failed to meet these requirements and have been so arranged that the tools and materials, when placed on their working platforms, are so located that the resulting cramped conditions render them almost useless. My invention overcomes this difficulty by providing a large working platform extending a substantial distance from the truck body to provide a large unobstructed and easily accessible working area. At the same time, despite its size, my bench design is erected or stored by a few simple operations.

Since the type of work for which these trucks are designed involve operations which must be carried on outside the protection of a building, it is desirable that a means be provided whereby the tools and materials may be easily and simply moved into the truck body and protected therein when the job is finished or in the event of an emergency such as a storm. By the provision of a work platform of the size utilized in my design and construction, most of the materials and tools may remain on it at all times, except when actually in use and, thus, are ready to be quickly moved into the truck body by the same operation which stores the platform itself. This arrangement saves an appreciable amount of time otherwise often wasted in collecting and storing tools and materials. When necessary my arrangement permits use of the tools on the workbench in inclement weather by protecting them with a collapsible shelter which may be quickly and simply put up or taken down. The shelter is mounted on the truck body and, therefore, is always at hand when required.

Another important factor in providing a workbench in the form of a platform erected by a simple movement in and out of a truck body, is the fact that the work bench should always be the correct height, for this is an important factor to men doing careful work. In my invention the height of the bench is determined at the time of installation of the platform and thereafter always remains the same.

Since in the particular use of a truck of this type, especially those used by plumbers, electricians and similar service trades, a large quantity of different types of parts, materials and tools must be readily available at each job, it is necessary to provide a maximum of available storage space within the truck without at the same time unduly restricting the space available for the large and heavy items often required at each particular job. To accomplish this, the available space must be divided into units of a size and shape which will provide the maximum amount of storage. At the same time, since many small items are often involved, the available storage space must be divided into relatively small units to keep these items separated for easy accessibility. This I have accomplished by providing a number of compartments of assorted sizes and shapes along the sides and front of my truck body. The capacity of the truck to carry the larger items required on a particular job has been increased by a construction involving the provision of a structural roof capable of supporting heavy weights and accessible for loading and unloading. In addition, I have provided means for carrying elongated materials, such as pipes and rods, in a manner whereby they may be locked into position by simple clamps available only when the compartments have been opened.

Accordingly, it is a primary object of my invention to provide a truck body having a self-storing, large sized workbench.

It is a further object of my invention to provide a self-storing workbench which may be easily and simply erected or stored.

It is a still further object of my invention to provide a truck body having a workbench of large and unobstructed area.

It is another object of my invention to provide a truck body having a workbench which is of simple but sturdy construction.

Still another object of my invention is to provide a truck body having a maximum amount of storage space divided into compartments of various sizes and shapes.

It is an additional object of my invention to provide a truck body in which elongated items may be stored by a simple clamping operation.

It is a further object of my invention to provide a truck body having an accessible structural top capable of withstanding heavy loads.

Another object of my invention is to provide a truck body having a neat and pleasing appearance.

Other objects and purposes of my invention will be immediately seen by those acquainted with the art of truck body construction upon reading the following specification and the accompanying drawings.

In the drawings:

Figure 1 is an oblique view of my truck body as seen from its rearward left hand corner.

Figure 2 is a side elevational view of my truck body showing the right hand side of the truck taken along the plane II—II of Figure 3.

Figure 3 is a rear elevational view of my truck body showing the rear doors in open position.

Figure 4 is a sectional elevational view of my truck body taken along the plane IV—IV of Figure 1.

Figure 5 is a fragmentary sectional view of my truck body taken along the plane V—V of Figure 3.

Figure 6 is a fragmentary side view of my truck body showing the work platform in extended operating position.

Figure 7 is a fragmentary side elevational view of my truck body showing the mounting for my work platform.

Figure 8 is a fragmentary side elevational sectional view of the pipe compartment of my truck body taken along the plane VIII—VIII of Figure 4.

Figure 9 is an enlarged fragmentary oblique view of the joint structure of shelter support for my truck body.

Figure 10 is an enlarged fragmentary oblique view of the attachment arrangement for the shelter support to my truck body.

Figure 11 is a plan view of the shelter support for my truck body.

In carrying out the objects and purposes of my invention, I have provided a truck body equipped with a large, central, rearwardy opening chamber surrounded with a number of variously sized and shaped compartments and having a self-storing work platform mounted within the chamber and adapted to be moved in and out therefrom upon a series of friction reducing elements.

In the following description the terms "forward" and "rearward" will be freely used and are to be taken to mean in relation to the body as mounted upon a truck with the forward direction indicated by the arrow in Figure 1. The terms "interior" and "exterior" will also be freely used and are to be taken as meaning toward the geometric center of the truck body and away therefrom respectively. Further, throughout the following description, the fastening together of most parts is referred to as by welding. It will be understood, of course, that such reference is for illustrative purposes only and that any suitable fastening means or mode may be employed without affecting the scope of the invention.

Referring now to the drawings in greater detail, wherein one preferred embodiment is illustrated, the numeral 1 refers to a truck body having side panels 2 and 3, a front panel 4 and rear panels 5 and 6. The side panels 2 and 3 and the front panel 4 each have a horizontally extending top flange 7, 8 and 9 respectively. Downwardly extending skirts 10, 11 and 12 are provided at the inner edges of each of the top flanges 7, 8 and 9 respectively (Figure 4). A top plate 13 seats between the skirts 10, 11 and 12 and closes in the top of the truck body 1. A plurality of parallel, rectangular skid bars 14 are welded to the upper surface of the top plate 13. The top plate 13 is welded to the skirts 10, 11 and 12 and to a top frame 15 consisting of members which, in cross-section, are of inverted hat-shape and extend both laterally and longitudinally of the truck body (Figure 4).

At the rearward end of the top plate 13 and between each of the skid bars 14 a roller 92 is mounted so that the rod shaped material supporting member 93 thereof projects above both its own supports and the skid bars 14. This material supporting member 93 is mounted for free rotation whenever an object is moved across it.

The bottom of the truck body consists of a welded structural frame 16 made up of C-shaped beams 17 forming a single, substantially rigid base for the entire body. To the upper surface of this structural frame 16 a sheet metal floor 18 is welded (Figure 4).

Spaced approximately one-fifth of the width of the truck body interiorly from each of the side panels 2 and 3, the vertical walls 19 and 20 extend between the floor 18 and the top frame 15 and are welded to both (Figures 4 and 5). Between is a chamber 21 enclosed on its sides by the walls 19 and 20, at its bottom by the floor 18, at its top by the top plate 13 and at its front end by the partition 22 which extends between the walls and the top and floor and welded to each of them (Figure 5).

The rear of the chamber 21 is closed by a pair of doors 23 mounted by hinges on the rear panels 5 and 6. The doors 23 are equipped with handles 71 of any suitable type to facilitate operation. Braces 72 which are hat-shaped in cross-section are welded to the interior of the doors to provide strength and rigidity.

Surrounding the chamber 21 and separated therefrom by the walls 19 and 20 are a plurality of compartments 24 accessible through openings 25 in the side panels 2 and 3. The compartments 24 are of different sizes and shapes to accommodate different types of articles and to utilize efficiently the space available for this type of storage. The forward compartment 26 extends laterally the entire width of the truck body (Figures 2 and 5). Closure members 27 mounted by hinges to the side panels 2 and 3 close the openings 25 when the compartments are not in use. Each of the closure members 27 is equipped with a latch 28 operated by a key through the opening 29. By this arrangement all parts of the side panels 2 and 3 and the closure members 27 are flush with each other producing a surface having no projections to snag clothing as well as presenting a neat appearance. The upper and lower compartments are divided by platforms 30 and 31 (Figure 4). Platform 30 is welded to the side panel 2 and wall 19 and platform 31 is welded to the side panel 3 and wall 20. A wheel well 55 is provided on each side of the truck body and is enclosed on its upper side by a wall member 56 (Figures 1 and 4).

A substantially square pipe compartment 32 is located on the left hand side of the body and is open at both ends, where it extends through the rear panel 5 (Figure 1). This pipe compartment 32 is enclosed by a square tube 33 welded to the lower side of the platform 30 (Figure 4). The compartment extends the entire length of the truck body 1 from the rear panel 5 to the front panel 4. At points spaced substantially one-third of the length of the pipe compartment from the rear panel 5 and front panel 4, the clamps 35 are provided (Figures 4 and 8). These clamps each consist of a gripping member 36 and a handle 37 connected by a vertical threaded element 38 rigidly attached to the handle 37 but rotatably mounted to the gripping member 36. The handle 36 and the upper portion of the threaded element 38 of each clamp are each in one of the side compartments 24, located directly above the pipe compartment 32. Where the threaded element 38 passes through the platform 30 a reinforcing plate 39 is provided rigidly attached to the platform. A fitting 40 having an internally threaded opening seats upon the reinforcing plate and is likewise rigidly attached to the platform. The threaded element 38 passing through the fitting 40 engages the internal threading thereof. The gripping member 36 is shown equipped with teeth 41, however, such design is optional since omission of the teeth will not materially affect the operation of the clamps 35.

Inside the chamber 21 a shelf 42 extends rearwardly from the partition 22 substantially four-fifths the length of the chamber (Figures 3, 4 and 5). This shelf extends the entire distance between the walls 19 and 21 spaced upwardly from the floor 18 approximately one-half the height of the chamber 21. It is supported at its periphery by angle elements 43 welded to the walls 19 and 20 and the partition 22. At the rearward end of each of the angle elements 43 a stop plate 74 is provided seated within the angle elements and positioned substantially at a right angle to the walls 19 and 20. These stop plates 74 prevent the shelf 42 from sliding rearwardly off the angle elements 43. The shelf is made from heavy plywood or any other suitable material having the same deflection resisting characteristics. Above the shelf an article rack 45 consisting of vertical bars 46 and horizontal bars 47 to form an open grille container, is attached to the top plate 13 and the wall 19.

Below the shelf 42 and spaced vertically away therefrom a substantial distance is a work platform 48 having approximately the same length and width as the chamber 21 and made from one inch thick plywood or material having substantially the same characteristics. A cutout 49 is located in the center of the forward end of the work platform to permit mounting of a spare tire against the partition 22. The rearward end 50 of the work platform is provided with a metal edging member 51 fastened to the work platform by screws 52. Spaced inwardly from each edge of the work platform are hand openings 53 each formed by a semi-circular hole through the platform and closed at their rearward ends by the edging member 51 (Figure 5). Spaced a short distance forward of the edging member 51 and adjacent each of the sides of the platform, a circular opening 54 extends through the platform. The purpose of these openings will appear more fully hereinafter.

The work platform 48 is supported on the floor 18 by means of two groups of casters (Figures 4 and 7). One group 59 of casters 58 is attached to the lower surface of the work platform 48 adjacent its forward end and will move with the platform as it is extended from, or retracted into, the truck body. The group 57 of casters 58 is attached to the floor 18 adjacent the rearward end of the chamber 21. The casters 58 in each of first group 59 are laterally offset from those in the second group 57. The casters composing the second group remain stationary relative to the truck body and the platform 48 passes over them.

An L-shaped stabilizing member 60 having a vertical and a horizontal leg is located on each side of the work platform 48 (Figures 4 and 5). The vertical leg of one of the stabilizing members is welded to the wall 19 and of the other to the wall 20 in such a position that the horizontal leg of each is sufficiently spaced above the upper surface of the working platform 48 to provide for a running clearance between them. Near the rearward end of each of the stabilizing members 60 a small hole 61 is provided together with a similarly sized hole in the platform which vertically aligns with the hole 61 when the platform is in stored position as shown in Figure 5. A locking pin 62 passes through each of these openings to prevent movement of the platform 48 relative to the stabilizing members 60. To eliminate the possibility of loss, each of the pins 62 are preferably attached to the truck body by a chain 63 (Figure 3).

The supporting posts 64 each consist of a tubular shaft 65 rigidly attached to a disc-shaped base plate 66 and have a threaded upper end 67. A bearing plate 68, having an internally threaded opening, engages the threaded end 67 of the shaft 65. The length of the tubular shaft is such that it will extend between the platform and the surface upon which the truck is standing with sufficient additional length to permit limited adjustment of the distance between the base plate 66 and the bearing plate 68.

A shelter 75 protects the platform when such protection is necessary. The shelter consists of an awning 76 normally stored in a rolled up condition on a spring loaded rod within the awning case 77. The awning case 77 is welded or bolted to the rear panel of the truck body. The operating structure by which the awning is stored is not described in detail since it may be accomplished in any number of well known ways. One satisfactory construction for accomplishing this is that utilized in the conventional household window shade. A lip 78 extends rearwardly from the top of the awning case 77 to protect the awning from rain while in storage. A rod shaped stiffener 79 is attached to the end of the awning 76. The awning 76 is supported by a collapsible stand 80 consisting of a pair of legs 81 each pivotally attached at its upper end to a ridge member 82. At the ends where the ridge members 82 and the legs 81 are attached each is provided with a substantially disc-shaped portion 83 having a pivot pin 84 extending through the center of the portions 83 of both the legs and the ridge members. A stud 85 extends upwardly and rearwardly from the portion 83 of the ridge members 82 immediately above the pivot pin 84. Suitably reinforced openings thru the awning 76 permit the stud 85 to pass through the awning and engage the stiffener 79 when the awning is in extended position. The forward pull exerted on the awning 76 by the spring loaded rod in the awning case 77 holds the stiffener tightly against the stud 85 and keeps the awning itself straight.

Each of the leg and ridge member assemblies are maintained in properly spaced position by the stretcher bar 86 which detachably engages each of the ridge members 82 adjacent the disc portion 83 by means of the hook-shaped grip 87. Each of the ridge members 82 is detachably anchored to the truck body by means of an angle 88 integral with the ridge member, engaging the opening 89 in the anchor plate 90. The anchor plate 90 is welded to the awning case 77. The base of each of the legs 81 is equipped with a disc-shaped support 91.

The width of the awning 76 is such that it extends laterally beyond each side of the work platform 46 a substantial distance. The awning case 77 extends across the entire flat portion of the back panel of the track and the awning is substantially the same width. The awning is of sufficient length to extend rearwardly beyond the end of the work platform 48 when the latter is in its most extended position.

A dome light 69 is attached to the top frame 15 within the chamber 21 to provide a convenient source of light when needed. The closed loops 70 welded to the top flanges 7 and 8 are suitable for anchoring securing ropes when articles are transported on the top of the truck body.

All of the parts composing the truck body except the work platform 48 and the shelf 42 are preferably formed from a metal suitable for welding, such as steel. The work platform 48 and the shelf 42 are made from plywood to obtain rigidity and to provide a surface which will not injure tools which may be dropped upon them.

Assembly

The various panels and beams making up the exterior surface and walls of the compartments and chamber are all, in the embodiment here chosen to illustrate the invention, assembled by welding to form a single rigid body. Onto this body, the rear doors 23 and the closure members 27 for the side compartment 24, with one leg of their respective hinges already welded to them, are assembled by welding the remaining leg of the hinges to the panels of the truck body. The work platform is then installed merely by aligning it between the walls 19 and 20 of the chamber 21 and beneath the stabilizing members 60 and pushing it forwardly into the chamber.

The clamps 35 are assembled by turning the threaded element 38 through the fitting 40 and then welding the clamping member 35 to the lower end of the threaded element.

Operation

The work platform 48 is normally positioned entirely within the chamber 21 and held against motion relative to the truck body by insertion of the pins 62 in the holes 61 (Figures 3 and 5). In this position, the platform is conveniently stored within the chamber 21 and the doors 23 may be shut to enclose entirely the chamber 21. When the platform is to be used as a work bench, the doors 23 are opened and the platform is gripped by means of the hand openings 53 and pulled rearwardly until it projects a desired distance, usually more than two-thirds of its length, beyond the rear of the truck body. The supporting post is then placed, with its base plate 66 down, upon the surface on which the truck is resting and the upper end of the tubular shaft 65 is passed upwardly through the circular opening 54 in the work platform. The bearing plate 68 is then rotated to cause it to move up or down according to the distance between the platform and the surface upon which the truck is resting to provide an adjustment for variations in this distance. With the supporting post in place, the platform is provided with direct vertical support on both of its ends, thus, assuring a firm and level workbench. When the platform is again stored, the supporting post 64 is detached from the platform 48, and is conveniently stored within the chamber 21 by the spring clamps 73 which are welded to the wall 20 of the chamber. Such tools as a vise or a pipe clamp may be permanently mounted on the work platform to be stored or readied for use simultaneously with the operation of the platform itself. The provision of the dome light 69 assures a lighted working area at night when an occasion for such occurs.

When long and slender articles, such as pipes, are to be carried by the truck, the clamps 35 are opened and the articles are passed into the pipe compartment 32 through its open end from the rear of the truck body. The clamps 35 are then turned until the clamping member 36 firmly engages the articles preventing any further movement of them. Since the clamps can only be opened by means of the handles 37, the closing of the closure member 27 for the side compartments 24 in which these handles are located automatically prevents the clamps from being loosened. Therefore, the materials may be left over night on the truck without fear of loss since the act of closing the compartments prevents access to the clamps by which the articles are firmly held within the pipe compartment 32. Beyond this, the arrangement of thus entirely enclosing the clamps 35 provides a simple method of hiding them where they will not be detrimental to the exterior appearance of the truck body.

The closed loops 70 provide a neat and convenient anchor means when articles are carried on top of the truck body and have to be lashed down by ropes to prevent shifting. The rollers 92 facilitate the loading and unloading of the top of the truck by holding articles being loaded thereon away from the skid bars 14 and easing their movement by substituting a free roller for the sharp rear edge of the truck body. At the same time, the skid bars 14 reduce the surface friction when such articles are in place on the top of the truck body but provide sufficient friction to substantially keep them in place while in transit.

By providing a central chamber surrounded by a number of compartments of various sizes and shapes, the truck body is adapted to transport many types of small articles. Since each of the compartments is provided with a closure member, the truck body may be easily closed with all of the tools and materials secured within it against exposure to weather and theft. The work platform 48 being large enough to accommodate the tools and materials normally used at a particular operation, provides an easy method of storing all of the articles on it by the simple operation of sliding the work platform into the compartment and closing the doors 23. Much of the time lost in securing tools and in storing them again is thereby eliminated.

By this arrangement and construction there is provided a convenient truck body, especially adapted to utilize the entire interior capacity of the body and to provide a workbench wherever the truck may be. Although the drawings and description of my truck body herein given apply to one particular preferred embodiment, it is not my intention, implied or otherwise, to eliminate other variations or modifications which do not depart from the scope of the invention unless specifically stated to the contrary in the hereinafter appended claims.

I claim:

1. In a truck body adapted to provide a portable workbench, the combination comprising: means providing a central chamber having a floor, a closed forward end and an open rearward end; a first plurality of upwardly extending rotatable members mounted on said floor adjacent said rearward end of said chamber and equally spaced laterally of said chamber; a platform having a forward end and a rearward end removably received within said chamber and supported by said first plurality of rotatable members; a second plurality of downwardly extending rotatable members mounted on the forward end of said platform and rotatably engaging said floor, said rotatable members spaced to pass between said first plurality of rotatable members as said platform is moved longitudinally of said truck; rigid guide strips within said chamber slidably engaging the upper surface of said platform; said platform adapted in one position to be entirely received into said chamber and in another position to have its rearward end extend a substantial portion of said platform's length from said chamber; a detachable post of adjustable length associated with the rearward end of said platform when said platform is in extended position; detachable means for preventing extension of said platform when said platform is fully received into said chamber.

2. A body for a plumber's truck, comprising in combination: means defining a generally rectangular central compartment having a forward wall, side walls, a top and a floor; means providing a plurality of side compartments on the outside of both of said side walls which compartments may be independently opened and closed; means providing a further compartment extending across the entire width of both the central compartment and the side compartments at the forward end of said central compartment and having doors at the sides thereof for opening and closing same and thereby providing a substantially U-shaped compartmented zone on the outside of said central compartment at its sides and forward end; a table of substantially the width of the central compartment slidably supported adjacent the floor thereof for movement partially out therefrom, and detachable means for supporting it in substantially level position when so moved partially out of said compartment; a canopy containing housing extending the full width of said truck body and thereby extending beyond said table on each side thereof a distance substantially equal to the horizontal dimension of said side compartments; a canopy in said housing and extensible therefrom a distance sufficient to cover at least a substantial portion of said table when in an extended position and extending sidewardly beyond both sides of said table; demountable means temporarily holding said canopy in extended position over said table; whereby a wide variety of articles may be carried within and by said truck and there is provided convenient work-space alongside said truck which space may be sheltered from the weather.

NORBERT C. HOTOP.

REFERENCES CITED

The following references are of record in the file of this patent:

UNITED STATES PATENTS

| Number | Name | Date |
|---|---|---|
| 1,289,801 | Jones | Dec. 31, 1918 |
| 1,756,629 | Campbell | Apr. 29, 1930 |
| 1,886,782 | Bentz | Nov. 8, 1932 |
| 1,944,439 | Larsen | Jan. 23, 1934 |
| 2,159,022 | Hawkins | May 23, 1939 |
| 2,329,419 | Reed | Sept. 14, 1943 |